United States Patent Office 3,433,730
Patented Mar. 18, 1969

3,433,730
ELECTRICALLY CONDUCTIVE TOOL AND
METHOD FOR MAKING
George Charles Kennedy, Cincinnati, Ohio, assignor to
General Electric Company, a corporation of New York
No Drawing. Filed Apr. 28, 1965, Ser. No. 451,650
U.S. Cl. 204—291                              17 Claims
Int. Cl. B01k 3/06

ABSTRACT OF THE DISCLOSURE

An electrically conductive material removal tool, for example, a cutoff or grinding wheel or an electrical machining electrode, has a continuous electrical energy conducting means comprising a porous colloidal, refractory inorganic material, for example colloidal alumina, impregnated at least in part with an electrically conductive material, for example silver or silver oxide.

---

This invention relates generally to a tool useful in material removal employing electrical current. More particularly, in one form, it concerns an improved resin or polymer bonded electrically conductive tool which can be abrasive such as a grinding or cutoff-type tool or wheel and a method by which it is made.

The processes to which the present invention relates include electrodischarge as well as electrolytic material removal. However, the electrolytic type will be used herein as a typical example.

The process of electrolytic material removal involves the passage of an electrical current between a cathodic-tool and an anodic-workpiece through an electrolyte between the tool and workpiece to remove material from the workpiece. This process can be assisted by mechanical erosion involving the use of an abrasive, electrically conductive tool sometimes in the form of a grinding tool or wheel or cutoff wheel. Electric current can pass through the tool, which is the cathode, or can be confined to a surface of the tool. Such an abrasive tool can perform both as an electrode as well as an abrasive tool depending upon the application of electrical current.

In order to provide the cathode-tool with means to conduct electrical current, arrangements prior to the present invention have included the placement, by a variety of methods, of an electrically conductive material either in a non-abrasive or in an abrasive tool. For example, electrical current has been conducted by such means as wires, tubes or metal mesh in the structure of the wheel. In other cases, the tool is provided with a structure including a continuous pore system with an electrically conductive material placed therein. Electrolyte can pass through the tool or around its periphery.

The cost of the known abrasive tools of this type are relatively high compared with a similar non-conductive tool because of certain additional and costly steps required in the manufacture of the electrically conductive abrasive tool. Furthermore, it has been difficult and costly to provide strong electrically conductive resinous bonded tools, particularly in the form of thin cutoff wheels.

It is a principal object of the present invention to provide an improved electrically conductive tool which can be made economically according to presently known and used production methods.

A more specific object is to provide an improved electrically conductive abrasive tool for use in a material removal process requiring electrical energy, the tool being resin or polymer-bonded so that it can readily be made into thin discs for cutoff purposes as well as into tools of other shapes and sizes.

Another object is to provide an improved method for making such an electrically conductive tool to assure good electrical conductivity throughout the tool.

These and other objects and advantages will be more readily understood from the following detailed description and examples which are typical of but are not meant to be limitations on the scope of the present invention.

The broader aspect of the present invention recognizes that unexpected benefits can be obtained from the combination of an electrically conductive material and a finely divided porous material, the powder being impregnated with at least a portion of the conductive material. This combination of materials forms a continuous electrically conductive means or path from a point at which electrical energy is introduced into the tool to a working surface of the tool. In one specific form, the entire tool can be made of this combination of materials. Preferably, the conductive material is a finely divided material based on silver such as silver metal powder or silver oxide and the porous material preferably is a refractory colloidal oxide.

The combination of the electrically conductive material and the porous material is particularly valuable when it is interspersed to form continuous electrically conductive paths or means through a matrix of polymer-bonded abrasive grit, such as abrasive alumina. This arrangement has been found to provide an electrically conductive abrasive tool which has a very high degree of electrical conductivity throughout the entire tool, yet can be made by a method of a type presently used in commercial production of polymer-bonded abrasive tools. Thus one form of the electrically conductive tool of the present invention comprises a matrix of thermosetting polymer-bonded abrasive grit having interspersed therethrough continuous electrically conductive means of the combination of an electrically conductive material and a porous finely divided refractory inorganic material such as a colloidal oxide impregnated with at least a portion of the electrical conductive material.

In a more specific form, the present invention contemplates a tool suitable for use in an electrolytic material removal process consisting essentially of, by weight, at least about 6% and preferably 6–17% finely divided silver; at least about 6% and preferably 6–14% of a finely divided porous material, for example, colloidal alumina or silica, the powder being impregnated with at least a portion of the silver; with the balance of the tool being abrasive grit, a polymer and, optionally, cryolite. Preferably, these latter ingredients are in the range of about 10–15% polymer, 50–70% abrasive grit and up to about 5% cryolite sometimes referred to as sodium aluminum fluoride.

When the tool is formed such as by heat and pressure, without resin type binder, the tool consists broadly of at least about 6% and preferably 11–36% finely divided silver, at least about 11% and preferably 11–48% porous material, with the balance preferably at least about 50%, abrasive grit. In this form, the porous material such as colloidal alumina, can act as a binder as well as participating with the silver in providing an electrically conductive means through the tool.

The method form of the present invention contemplates producing an electrically conductive, resin bonded abrasive tool from a wet composition which includes about 6–11 weight percent of a liquid vehicle. The method involves first mixing together the finely divided conductive material such as silver, the liquid organic vehicle, the finely divided material such as colloidal alumina and the abrasive grit such as alumina grit. Then there are added to the mixture a dry resin and optionally cryolite. Thereafter, the mixture is pressed into a shape which is heated to polymerize the dry resin.

Presently known vitreous bonded electrically conductive abrasive tools have great utility particularly in connection with removing metal from a workpiece of a difficult-to-work material such as the nickel base or cobalt base superalloys. However, a resinous or polymer-bonded abrasive tool has the advantage of being capable of being molded directly into thin cutoff wheels having sufficient resiliency to prevent their shattering. In addition, provision of a polymer binder allows the tool to be cast into more complex shapes through the use of conventional molds.

Normal production procedures involved in the manufacture of non-electrically conductive resinous bonded cutoff wheels involves the mixing together of the abrasive grit and resinous materials, the polymers being generally in both liquid and solid form, placing the mixture into a mold, pressing the mixture in the mold, removing the molded wheel from the mold and then heating the molded wheel very slowly up to a temperature at which the resinous ingredients bond. Then the molded and baked wheel cooled slowly. This slow heating and cooling of the tool generally prevents cracking as a result of the removal of volatile or decomposable ingredients.

Known electrically conductive vitreous bonded abrasive tools frequently introduce silver or silver oxide or both into the matrix of an abrasive tool to provide an electrically conductive path through the tool. Silver is used because its oxide is a good electrical conductor whereas other oxides such as copper oxide are not. It was found, however, that, as will be shown in Examples 1-3 below, the introduction of economically small quantities of finely divided silver into the ingredients of a resinous bonded cutoff wheel, did not result in an electrically conductive product. Apparently the resinous materials coated and electrically insulated the silver particles, thus breaking the electrically conductive path through the resinous bonded tool. It was unexpectedly recognized, however, that if finely divided, porous refractory oxide, sometimes referred to as a colloidal oxide, is first impregnated with the electrically conductive material and if a certain quantity of this material is provided in the composition of the tool, a polymer-bonded electrically conductive tool can readily be made substantially by known production methods.

One form of such a colloidal oxide which plays a significant part in the present invention is a white powder grouped as clusters of minute fibrils of boehmite (AlOOH) alumina. This material is commercially available as colloidal alumina. Among other things, this material has a high surface reactivity, is highly porous and, in addition, acts as a bonding agent. Thus it can replace the polymer as a binder for some apllications. A typical example of the composition of colloidal alumina in its commercial form, consists, by weight, of 83.1% AlOOH, 9.8% $CH_3COOH$, 1.7% $SO_4$, 5% water with the balance minor components of $NH_4$, Na, Fe and $SiO_2$. This material is more fully described in U.S. Patent 2,915,475, Bugosh issued Dec. 1, 1959.

Many suitable electrically conductive materials are available for use in the practice of the present invention. Although these are sometimes referred to herein as "electrically conductive materials," it is to be understood that such reference intends to include in its meaning those materials which are electrically conductive as well as those materials which can be made electrically conductive, for example, such as through heating to volatilize or decompose a carrier or to reduce an oxide to its free metal.

One type of electrically conductive material which is specifically preferred in the practice of this invention is silver metal or silver oxide. Generally these materials can be obtained in dispersion form in an organic vehicle which may include a solvent and a resin of either the thermoplastic or the thermosetting type. In the evaluation of the present invention, organic vehicles were tested including either thermosetting or thermoplastic or both types of resins. Suitable electrically conductive materials are commercially available as Conductive Coating Materials Numbers 4817, 4887, 5815 and others. Considerable literature is available on these types of dispersions of electrically conductive materials, for example U.S. Patents 2,851,380, Berlinghof, Jr., issued Sept. 9, 1958, and 2,592,870. Dickenson et al. issued Apr. 15, 1952.

As was mentioned above, the electrically conductive material is preferably silver or silver oxide or both. The oxide of silver is unique in that it has a high degree of electrical conductivity as compared with other oxides, such as copper oxide. Thus with the use of a silver electrically conductive material, normal air atmosphere production heating and pressing methods, such as are used in the making of resinous bonded grinding or cutoff wheels, can be used. There need be no requirement for an inert or reducing atmosphere during the heating cycles to avoid oxidation of the conductive material, an occurrence which normally would increase the tool's electrical resistance.

The present invention will be more clearly understood from a review of some specific examples. These examples are typical of the present invention but are not meant to be limiting.

Typical ingredients included in the manufacture of standard or known cutoff wheels, such as of 12" in diameter by $\%_{32}$" thick with about a 1" bore, consist of, by weight, about 11% of a powdered phenol-formaldehyde molding resin or plastic (one form of which is known as Bakelite thermosetting molding plastic), 3% cryolite, 1% of a liquid resin such as a phenolic or an epoxy, about 0.1% furfural, with the balance (about 85%) alumina grit. The grit size generally ranges from about 60 mesh to about 100 mesh for resin bonded cutoff wheels.

The above ingredients are mixed in the order given above and the mixture is placed in a wheel mold to which pressure is applied in an amount depending on the density desired in the wheel. For example, generally from about 1000 to about 2000 p.s.i. is used. The wheel is removed from the mold and the molded wheel is then placed in an air oven at room temperature. It is then heated to a temperature required to polymerize or harden the plastic, for example, 300–500° F. After heating to that temperature, the wheel is allowed to cool slowly to room temperature.

As was mentioned above, one of the objects of this invention is to provide an improved electrically conductive abrasive tool which can be made according to presently used procedures such as the one described above. Therefore, silver was added to the standard mixture in the proportions shown in the following Table I. The silver was added as a finely divided dispersion in an organic vehicle including a thermosetting resin, commercially known as Material Number 5815 referred to before. The silver represented 55 weight percent of the total material. For comparison purposes, the percentages of the standard ingredients are included in the following table and referred to as "Std."

TABLE I.—WET COMPOSITION, WEIGHT PERCENT

| Example | Dry resin | Liquid resin | Cryolite | Alumina grit (60 mesh) | Ag metal | Liquid organic vehicle | Furfural |
|---|---|---|---|---|---|---|---|
| Std | 11.3 | 1.2 | 2.6 | 84.8 | | | 0.1 |
| 1 | 10.5 | 1.1 | 2.4 | 78.7 | 4.0 | 3.2 | 0.1 |
| 2 | 11.0 | 1.2 | 2.5 | 82.9 | 1.3 | 1.0 | 0.1 |
| 3 | 10.8 | 1.2 | 2.5 | 81.0 | 2.5 | 2.0 | |

In the above and following tables, the dry resin was powdered Bakelite thermosetting molding compound of the phenolic type. In Table I, the liquid organic vehicle included a thermosetting resin. The standard wheel was electrically non-conductive because of the absence of silver or other electrically conductive material. The material of Example 1 was too wet to be molded. However, the material of Examples 2 and 3 were molded into a wheel having a diameter of 12″ with a 1¼″ central bore and a thickness of 3/32″. Even though silver metal was dispersed throughout their matrix, the wheels of Examples 2 and 3 were found to have high electrical resistance. The standard wheel as well as wheels of Examples 2 and 3 were molded according to the manufacturing procedure described above, including pressing at about 2000 p.s.i. and heating in air to a temperature of about 350° F.

In order to reduce the liquid content of the composition to allow it to be more readily moldable, the liquid resin and the liquid furfural were found to be unnecessary to the composition and were eliminated. Subsequently it was found that cryolite was not essential to the composition of the present invention and can be eliminated. However, it was unexpectedly recognized that when the above described colloidal alumina, was first impregnated with the silver dispersion and mixed with the alumina grit, an unexpectedly high degree of electrical conductivity was achieved.

A number of additional examples were studied as a result of this unexpected recognition. The following Table II is a summary of the composition in percent by weight of the wet mixtures used for molding of specimens and wheels in the examples discussed in more detail below.

in Table II in the order shown from left to right and treating as in Example 4, there resulted a more dense structure having electrical conductivity better than the specimen of Example 4.

Examples 6 and 7

In order to determine if the improved compositions could be made into conductive cutoff wheels, the ingredients shown in Table II for Examples 6 and 7, were made into 12″ diameter cutoff wheels 3/32″ thick with a 1¼″ bore. The quantity of mixture used was about 600 grams for the wheel of Example 6 and about 450 grams for the wheel of Example 7.

The ingredients were mixed in the order shown from left to right in Table II for these examples. Of the total silver content of 12.1% in Example 6, 4.9% was added with the 8.7% porous colloidal alumina powder in the form of the Pre-mix B described in connection with Example 5. The balance of the silver in Example 6 was added as conductive material No. 5815. In Example 7, all of the silver was added with the liquid organic vehicle in the form of conductive material No. 5815.

After placing the material in a mold and pressing at about 2000 p.s.i. followed by baking to 350° F. as described before, it was found that wheels could be made from these ingredients. However, it was found that the wheels of Examples 6 and 7 were electrically non-conductive.

Example 8

Example 7 was repeated except that the conductive ma-

TABLE II.—WET COMPOSITION, WEIGHT PERCENT

| Example | Resin | Cryolite | Alumina grit (60-100 mesh) | Ag metal | Liquid organic vehicle | Colloidal alumina |
|---|---|---|---|---|---|---|
| 4 | 9.6 | 3.7 | 59.4 | 10.7 | 8.8 | 7.8 |
| 5 | 9.7 | 3.6 | 59.4 | 12.0 | 5.2 | 10.1 |
| 6 | 12.1 | 4.0 | 57.1 | 12.1 | 6.0 | 8.7 |
| 7 | 11.0 | 3.6 | 51.8 | 13.2 | 10.8 | 9.6 |
| 8 | 11.0 | 3.6 | 51.8 | 13.2 | 10.8 | 9.6 |
| 9 | 9.7 | 3.6 | 59.4 | 14.5 | 6.6 | 6.2 |
| 10 | 10.8 | 3.6 | 51.0 | 13.9 | 11.3 | 9.4 |
| 11 | 11.5 | 3.8 | 54.5 | 11.1 | 9.0 | 10.1 |
| 12 | 10.7 | 3.5 | 50.3 | 14.6 | 8.4 | 12.5 |
| 13 | 11.8 | 3.9 | 63.2 | 7.0 | 5.8 | 8.3 |
| 14 | 10.8 |  | 57.7 | 15.4 | 8.5 | 7.6 |

As used in the above tables and elsewhere in this specification, percentages are by weight.

Example 4

The ingredients for Example 4 shown in Table II were mixed together, without particular regard to order of mixing, and were pressed into 1″ diameter slugs under a pressure of about 2000 p.s.i. The slugs were put in an air oven at room temperature and heated slowly to about 350° F. after which they were allowed to cool to room temperature. The silver metal and liquid organic vehicle were introduced together as conductive material No. 5815 referred to above. The slugs were found to have adequate electrical conductivity, though not as dense as might be desired for certain applications.

Example 5

In order to further improve the electrical conductivity and density of the 1″ diameter slugs produced in Example 4 above, a mixture of 50% colloidal alumina was mixed with 50% of conductive material No. 5815. This conductive material included finely divided silver metal, a small amount of a thermosetting resin and an organic vehicle. The mixture was baked at 325° F. to dry and then was pulverized into a powder hereafter referred to as Pre-mix B. During this mixing process, the highly porous colloidal alumina powder absorbed the finely divided silver in the conductive material. Upon mixing the Pre-mix B with the other ingredients as listed for Example 5 terial No. 8515 was first mixed with the alumina grid and colloidal alumina before adding the dry resin and cryolite. After a wheel of the same size was made in the same manner as in Example 7, the resulting wheel had good electrical conductivity. First the wheel was speed tested at 5500 r.p.m., a standard speed test used by a manufacturer of cutoff wheels. Then it was used successfully in an electrolytic cutoff process on a standard conductive spindle to cut struts made from an iron base superalloy sometimes referred to as A-286 alloy. The wheel was then purposely broken and found to be electrically conductive throughout.

Example 9

In order to understand more fully the present invention and to determine if other similar conductive materials could be used, a Pre-mix C was made of 40% colloidal alumina and 60% of a conductive material No. 4817. This conductive material included, in addition to 43% of finely divided silver metal, a thermoplastic rather than a thermosetting resin as in No. 5815 and an organic vehicle. Of the 14.5% silver metal in the wet composition shown for Example 9 in Table II, 9.4% was added along with the 6.2% colloidal alumina and 5.1% Ag was added along with the liquid organic vehicle in the form of conductive material No. 4817. One inch diameter slugs made as above from the composition of Example 9 had good electrical conductivity.

Example 10

The composition of Example 7 was repeated except that a small additional amount of silver was added along with an additional amount of liquid organic vehicle in the form of conductive material No. 5815 to provide the wet composition shown for Example 10 in Table II.

This composition was too wet to mold. Thus in excess of about 11% of a liquid vehicle results in a composition which is too wet to mold in the practice of the method of the present invention.

Example 11

The composition of Example 7 was repeated in Example 11 except that the amount of conductive material No. 5815 was reduced. The electrical conductivity and strength of a cutoff wheel of the size described above made with the composition of Example 11 was very good when formed according to the method described above in connection with Example 8. In this case the wheel was formed at about 2000 p.s.i. pressure and heated to a temperature of about 350° F.

Example 12

The composition of Example 11 was repeated except that additional finely divided silver metal was introduced into the wheel through the use of the Pre-mix B described in Example 5. Of the 14.6% silver in Example 12, 10.3% was added along with the 8.4% liquid organic vehicle as conductive material No. 5815. The balance of the silver, 4.3% was added with 7.8% of the total 12.5% colloidal alumina as Pre-mix B, with the 4.7% balance of the total colloidal alumina being added separately. Even with this unusual combination of ingredients, mixed in the order as shown in Example 8, the resulting wheel had excellent electrical conductivity and strength.

Example 13

The ingredients shown in Table II for Example 13 were mixed in the order as indicated in Example 8, with the silver being added along with the organic vehicle as conductive material No. 5815, separately from the colloidal alumina. Although this composition was capable of being molded into a wheel, it was found that it was very dry and on the lower limit of moldability with regard to liquid content. Thus this example shows that at least about 6% liquid vehicle is required in the mix in order to allow the composition to be moldable. Along with Example 10, this Example 13 shows that critical range of about 6–11 weight percent liquid vehicle is required for the wet composition in the practice of the method of the present invention.

Example 14

An experiment with the composition as shown for Example 14 in Table II was conducted to show that although cryolite is generally included with alumina grit in certain manufacture of ceramic type articles, it is not necessarily required in the practice of the present invention. The article which resulted from Example 14 had good strength and electrical conductivity. In the composition of Example 14, 10.5% of the total 15.4% silver was added as conductive material No. 5815 along with the organic vehicle and 4.9% silver was added with the total 7.6% colloidal alumina as Pre-mix C discussed in connection with Example 9.

In order to more fully understand the composition of the final molded tool of the present invention, the following Table III is prevented. In Table III, the dry composition, in percent by weight, is shown as typical of the final composition of the manufactured tool.

TABLE III.—DRY COMPOSITION, WEIGHT PERCENT

| Example | Dry resin | Cryolite | Alumina Grit | Ag metal | Colloidal alumina |
|---------|-----------|----------|--------------|----------|-------------------|
| Std     | 11.4      | 2.6      | 86.0         |          |                   |
| 1       | 11.0      | 2.5      | 82.3         | 4.2      |                   |
| 2       | 11.3      | 2.6      | 84.8         | 1.3      |                   |
| 3       | 11.1      | 2.6      | 83.7         | 2.6      |                   |
| 4       | 10.6      | 4.0      | 65.1         | 11.8     | 8.5               |
| 5       | 10.2      | 3.9      | 62.6         | 12.7     | 10.6              |
| 6       | 12.9      | 4.3      | 60.6         | 12.9     | 9.3               |
| 7       | 12.3      | 4.1      | 58.0         | 14.8     | 10.8              |
| 8       | 12.3      | 4.1      | 58.0         | 14.8     | 10.8              |
| 9       | 10.4      | 3.9      | 63.5         | 15.6     | 6.6               |
| 10      | 12.2      | 4.0      | 57.5         | 15.7     | 10.6              |
| 11      | 12.7      | 4.2      | 59.8         | 12.2     | 11.1              |
| 12      | 11.7      | 3.9      | 54.9         | 15.9     | 13.6              |
| 13      | 12.5      | 4.1      | 67.1         | 7.5      | 8.8               |
| 14      | 11.8      |          | 63.1         | 16.8     | 8.3               |

Because the articles made from the compositions of Examples 1, 2 and 3 and the standard composition were non-conductive, it can be recognized that more than 4.2% Ag is required by the electrically conductive, resin bonded, abrasive tool form of the present invention shown in the examples. In addition, as little as about 6% of a finely divided porous powder such as colloidal alumina can be included along with the abrasive grit such as alumina grit to provide a satisfactory abrasive electrically conductive tool.

As shown above, it was recognized that the combination of a finely divided porous material impregnated with at least a portion of an electrically conductive material provided an unusually good electrically conductive path or means through a tool. In addition, because colloidal alumina has binding capabilities when subjected to heat and pressure, a series of samples were prepared from that colloidal alumina, silver metal and alumina grit. The materials used were in the forms mixed in the examples above and none of the Pre-mixes were used unless indicated.

Example 15

A mixture was made of, by weight, 32.2% alumina grit, 32.2% colloidal alumina and 35.6% silver metal. The silver metal was added in conductive material No. 5815 in which it constituted 55 weight percent of the ingredients of that conductive material, the balance being an organic vehicle including a small amount of a thermosetting resin. This wet mixture was then baked at 400° F. until it was completely dry. The resulting product was ground to a powder which was then placed in a heated press at 300° F. and a pressure of 4200 p.s.i. was applied for ½ hour to form small grinding wheels. The wheels thus made had a dense, solid structure. One of the wheels was then fired at 1200° F. and successfully tested with an unfired wheel as an electrically assisted grinding wheel. These grinding wheels drew approximately 250 amps each with the fired wheel wearing better than the unfired wheel.

The procedure of this example was repeated to make a full size 8" O.D. x 3" I.D. x ¼" thick grinding wheel. This wheel was used to grind successfully a nickel base superalloy sometimes referred to as M-252 nickel base alloy. During this grinding operation, alloy material was removed to a depth of from 0.02" to 0.08" per pass with no marked increase in spindle amperage but with excellent electrolytic amperage.

After it was recognized that satisfactory tools could be made without the use of a resinous type binder, an additional series of examples were studied. From these it was found that certain ranges existed for silver and colloidal alumina when used in the practice of this form of the present invention. Representative of these additional examples are Examples 16 through 23 shown in the following Table IV.

TABLE IV.—DRY COMPOSITION, WEIGHT PERCENT

| Example | Alumina grit | Colloidal alumina | Ag metal | Remarks |
|---|---|---|---|---|
| 15 | 32.2 | 32.2 | 35.6 | Low resistance; good bond. |
| 16 | 39.2 | 39.2 | 21.6 | Do. |
| 17 | 46.8 | 46.8 | 6.4 | 4 ohm resistance; good bond. |
| 18 | 47.1 | 47.1 | 5.8 | Very high resistance; good bond. |
| 19 | 44.5 | 44.5 | 11 | Very low resistance; good bond. |
| 20 | 55 | 33 | 12 | Do. |
| 21 | 66 | 22 | 12 | Do. |
| 22 | 77 | 11 | 12 | Very low resistance; poor bond. |
| 23 | 77.8 | 11.1 | 11.1 | Very low resistance; fair bond.[1] |

[1] 4,000 p.s.i. used.

The examples in Table IV, with the exception of Example 15 discussed in detail above and Example 23, were prepared by pressing at 2000 p.s.i. and heating at 900° F. for five minutes. Example 23 was heated to 900° F. for five minutes at a pressure of 4000 p.s.i.

It is to be noted from Table IV that in this form of the present invention, more than about 6.4 weight percent silver metal is required. This is shown by Examples 17 and 18 which resulted in products of high electrical resistance. As was shown by Example 15, up to as high as 36% silver can be used provided sufficient binder is present. Examples 22 and 23 indicate that at least about 11% colloidal alumina is required in this type of composition. Thus a tool according to the present invention including the three types of ingredients listed in Table IV would consist essentially of, by weight, more than about 6% Ag, at least about 11% finely divided porous powder, such as colloidal alumina, with the balance an abrasive grit.

Example 24

Example 16 was repeated except that silicon carbide grit was substituted for the alumina grit. A product of low electrical resistance and good bond resulted. Thus this invention contemplates the use of a wide variety of other types of abrasive grits, for example, diamonds and boron nitride having a cubic crystal structure.

In order to understand more fully the effect of time at temperature and pressure in the practice of the method and on the product of the present invention, an additional series of examples were studied. Typical of these examples are those presented in Table V.

TABLE V.—DRY BASIS, WEIGHT PERCENT

| Example | Alumina grit | Colloidal alumina | Ag metal | Pressure (p.s.i.) | Resistance Megohms | Resistance Ohms | Hardness |
|---|---|---|---|---|---|---|---|
| 25 | 47.6 | 47.6 | 4.8 | 2,000 | 50 | | H |
| 26 | 47.6 | 47.6 | 4.8 | 6,000 | 50 | | H |
| 27 | 43.5 | 43.5 | 13.0 | 2,000 | | .2 | MH+ |
| 28 | 43.5 | 43.5 | 13.0 | 6,000 | | .15 | H |
| 29 | 65.3 | 21.7 | 13.0 | 2,000 | | .15 | MH+ |
| 30 | 65.3 | 21.7 | 13.0 | 6,000 | | .05 | H |
| 31 | 71.4 | 23.8 | 4.8 | 2,000 | 150 | | MH |
| 32 | 71.4 | 23.8 | 4.8 | 6,000 | 50 | | MH |
| 33 | 78.3 | 8.7 | 13.0 | 2,000 | | .05 | S |
| 34 | 78.3 | 8.7 | 13.0 | 6,000 | | .05 | M |

S=Soft, M=Medium, MH=Medium Hard, H=Hard.

The examples in Table V were prepared by molding at the pressure shown for from 1 to 5 minutes while heating at a temperature of 900° F. It was determined that the time at temperature had little significance although an increase in molding pressure, as is shown in Table V, can increase the hardness of the product. Confirming the example of Table IV, Examples 25, 26, 31 and 32 in Table V show that percentages of silver at less than about 6%, i.e., 4.8%, results in a tool of high electrical resistance. In addition, as shown by Examples 33 and 34, less than about 11% colloidal alumina results in a structure of insufficient hardness.

Example 35

As was mentioned above, the present invention contemplates the use of other colloidal oxides in addition to the colloidal alumina used in the previous examples. In this example, 10 grams of a liquid colloidal silica suspension, one form of which is known and available commercially as Ludox material, was mixed with 10 grams of conductive material No. 5815 described above and 10 grams of tungsten powder. It is to be noted that the abrasive grit was eliminated from this example because the intention was to produce a tool suitable for use as an electrode in electrodischarge machining.

The mixture was heated in air until dry and a hard solid material resulted. The material was then ground into fine powder and placed in a die which was placed under a pressure of 2000 p.s.i. and heated to a temperature of 900° F. A strongly bonded product having good electrical conductivity was obtained. After testing, it was found to be suitable for use as a electrodischarge machining electrode.

Example 36

One method of impregnating the finely divided porous material, such as the colloidal oxide used in the present invention, with the electrically conductive material is by reduction of a material such as silver nitrate to silver. In this example, an aqueous silver nitrate solution was made by adding 100 grams of silver nitrate to 50 cc. of water. When all the silver nitrate was in solution, a mixture was made of 5 grams of colloidal alumina, 40 grams of the silver nitrate solution and 35 grams of alumina grit. The colloidal alumina and the silver nitrate solution were mixed until a thick paste was formed then the grit was added. This mixture was placed in a die under 4000 p.s.i. The temperature was raised to 1000° F., which was sufficiently high to decompose the silver nitrate, after which the die was cooled. This procedure resulted in a block which had no apparent electrical resistance when tested with an ohm meter. Inspection under a microscope of the internal portions of the product of this example revealed a very good and continuous coating of silver in a porous structure.

Although the present invention has been described in connection with specific examples including specific ingredients, it will be recognized by those skilled in the art the variations and modifications of which this invention is capable. By the appended claims, it is intended to cover all such equivalent variations and modifications.

What is claimed is:

1. An electrically conductive tool including a continuous means capable of conducting electrical energy from a point on the tool at which electrical energy is introduced into the tool to a working surface of a tool, the means comprising the combination of an electrically conductive material and a porous, colloidal, refractory inorganic material impregnated with at least a portion of the electrically conductive material.

2. The tool of claim 1 in which the electrically conductive material is based on silver and the inorganic material is a refractory oxide.

3. The tool of claim 2 in which the refractory oxide is alumina.

4. An electrically conductive, polymer-bonded electrolytic material removal tool comprising:
   an electrically conductive material;
   a porous colloidal oxide impregnated with at least a portion of the electrically conductive material;
   the combination of the electrically conductive material and the colloidal oxide defining a continuous means capable of conducting electrical energy from a point on the tool at which electrical energy is introduced into the tool to a working surface of the tool; and
   a thermosetting polymer bonding together the colloidal oxide and the electrically conductive material.

5. The tool of claim 4 in which the electrically conductive material is based on silver and the porous colloidal oxide is alumina.

6. An electrically conductive, abrasive electrolytic material removal tool comprising:
   abrasive grit;
   an electrically conductive material; and
   a porous colloidal oxide impregnated with at least a portion of the electrically conductive material;
   the combination of the electrically conductive material and the colloidal oxide defining a continuous means capable of conducting electrical energy from a point on the tool at which electrical energy is introduced into the tool to a working surface of the tool.

7. The tool of claim 6 in which the abrasive grit is alumina; the electrically conductive material is based on silver; and the colloidal oxide is alumina.

8. An electrically conductive, abrasive electrolytic material removal tool comprising, by weight:
   more than about 6% silver;
   at least about 11% of porous colloidal alumina impregnated with at least a portion of the silver;
   the combination of the silver and the colloidal alumina defining a continuous means capable of conducting electrical energy from a point on the tool at which electrical energy is introduced into the tool to a working surface of the tool; and
   the balance alumina abrasive grit;
   the colloidal alumina binding together the alumina grit and the silver.

9. The tool of claim 8 in which the silver is about 11–36%; the colloidal alumina is about 11–48% and the alumina abrasive grit is at least about 50%.

10. An electrically conductive, abrasive, polymer-bonded electrolytic material removal tool comprising;
    abrasive grit;
    an electrically conductive material;
    a porous colloidal oxide impregnated with at least a portion of the electrically conductive material;
    the combination of the electrically conductive material and the colloidal oxide defining a continuous means capable of conducting electrical energy from a point on the tool at which electrical energy is introduced into the tool to a working surface of the tool; and
    a thermosetting polymer bonding together the abrasive grit, the colloidal oxide and the electrically conductive material.

11. The tool of claim 10 in which the abrasive grit is alumina; the electrically conductive material is based on silver; and the colloidal oxide is colloidal alumina.

12. The tool of claim 11 in which the alumina abrasive grit is at least about 50%; the silver is at least about 6%; the colloidal alumina is at least about 6%; and which includes in addition, up to about 5% cryolite.

13. The tool of claim 12 in which the alumina abrasive grit is about 50–70%; the silver is about 6–17%; and the colloidal alumina is about 6–14%.

14. The tool of claim 13 in which the alumina is about 55–67%; the silver is about 7.5–16.8%; and the colloidal alumina is about 6.6–13.6%.

15. In a method of making an electrically conductive polymer-bonded abrasive electrolytic material removal tool, the steps of:
    mixing abrasive alumina grit, a porous colloidal oxide powder, a finely divided material based on silver and about 6–11% of a liquid vehicle; and then
    adding to the mix a thermosetting polymer.

16. In a method as described in claim 15, in which the tool comprises, by weight, about 50–70% abrasive alumina grit, about 6–14% of a porous colloidal oxide powder, about 6–17% of finely divided silver, about 6–11% of a liquid vehicle, up to about 5 weight percent cryolite with the balance a thermosetting polymer, the steps of:
    mixing the abrasive alumina grit, the porous colloidal oxide powder, the finely divided silver and the liquid vehicle to produce a first mixture;
    adding to the first mixture cryolite which is to be included and the thermosetting polymer in dry powdered form to produce a second mixture;
    pressing the second mixture in a mold to form an uncured tool;
    removing the uncured tool from the mold;
    slowly heating the uncured tool to a temperature which will cause the thermosetting polymer to pulverize; and then
    slowly cooling the tool.

17. The method as described in claim 16 in which tool the abrasive alumina grit is about 55–67%, the porous colloidal alumina is about 6.6–13.6% and the silver is about 7.5–16.8% and in which:
    the second mixture is pressed at a pressure of from a small but effective amount up to about 6000 p.s.i.; and
    the heating of the uncured tool is at a temperature of about 300–500° F.

References Cited

UNITED STATES PATENTS

| | | | |
|---|---|---|---|
| 2,793,992 | 5/1957 | Heuser | 204—224 XR |
| 3,061,529 | 10/1962 | Crompton | 204—143 |
| 3,238,114 | 3/1966 | Halverstadt et al. | 204—224 |
| 3,329,488 | 7/1967 | Cofran | 51—298 XR |

HOWARD S. WILLIAMS, *Primary Examiner.*

D. R. VALENTINE, *Assistant Examiner.*

U.S. Cl. X.R.

204—143, 224, 284; 51—298